(12) United States Patent
Berkey et al.

(10) Patent No.: US 8,490,432 B2
(45) Date of Patent: Jul. 23, 2013

(54) METHOD AND APPARATUS FOR MAKING A GLASS SHEET WITH CONTROLLED HEATING

(75) Inventors: Adam C Berkey, Lexington, KY (US);
Nikolay A Panin, Saint-Petersburg (RU);
Eunyoung Park, Elmira, NY (US)

(73) Assignee: Corning Incorporated, Corning, NY (US)

(*) Notice: Subject to any disclaimer, the term of this patent is extended or adjusted under 35 U.S.C. 154(b) by 208 days.

(21) Appl. No.: 12/953,907

(22) Filed: Nov. 24, 2010

(65) Prior Publication Data

US 2011/0126587 A1 Jun. 2, 2011

Related U.S. Application Data

(60) Provisional application No. 61/265,003, filed on Nov. 30, 2009.

(51) Int. Cl.
*C03B 17/06* (2006.01)
*C03B 5/24* (2006.01)

(52) U.S. Cl.
USPC ............. 65/53; 65/45; 65/29.21; 65/162

(58) Field of Classification Search
USPC .................................. 65/29.21, 162
See application file for complete search history.

(56) References Cited

U.S. PATENT DOCUMENTS

| | | |
|---|---|---|
| 1,565,319 A | 12/1925 | Fowle |
| 1,731,260 A | 10/1929 | Nobbe |
| 3,506,429 A | 1/1967 | Overman ............... 65/203 |
| 3,338,696 A | 8/1967 | Dockerty ............... 65/145 |
| 3,682,609 A | 8/1972 | Dockerty ............... 65/83 |
| 7,681,414 B2 | 3/2010 | Pitbladdo ............... 65/193 |
| 2003/0121287 A1 | 7/2003 | Chalk et al. ............ 65/90 |
| 2005/0145614 A1* | 7/2005 | Wu et al. ............... 219/390 |
| 2005/0268659 A1* | 12/2005 | Rhoads ................. 65/53 |
| 2006/0016219 A1 | 1/2006 | Pitbladdo ............... 65/29.21 |
| 2008/0202165 A1 | 8/2008 | Hoysan et al. .......... 65/90 |
| 2008/0282736 A1 | 11/2008 | Filippov et al. ........ 65/90 |

FOREIGN PATENT DOCUMENTS

| | | |
|---|---|---|
| CN | 101012098 | 8/2007 |
| CN | 101318765 | 12/2008 |
| EP | 0626059 | 2/1993 |
| EP | 1746076 | 7/2005 |
| JP | 2001031434 | 6/2001 |
| WO | WO02/44102 | 6/2002 |
| WO | WO2005/110934 | 11/2005 |
| WO | WO2008/143981 | 11/2008 |

OTHER PUBLICATIONS

Geankoplis, "Transport Processes and Unit Operations", Allyn and Bacon, Inc. pp. 205-211, copyright 1983.*

* cited by examiner

*Primary Examiner* — Christina Johnson
*Assistant Examiner* — Lisa Herring
(74) *Attorney, Agent, or Firm* — Thomas R. Beall; William J. Tucker

(57) ABSTRACT

A method and apparatus for forming a glass sheet using a fusion down-draw process, wherein the heating powers of the heating elements are managed such that in case of a failure of one heating element, the heating power of the adjacent heating element is immediately increased. The method decreases the thermal stress the forming body is exposed to due to the failure of the heating element.

16 Claims, 3 Drawing Sheets

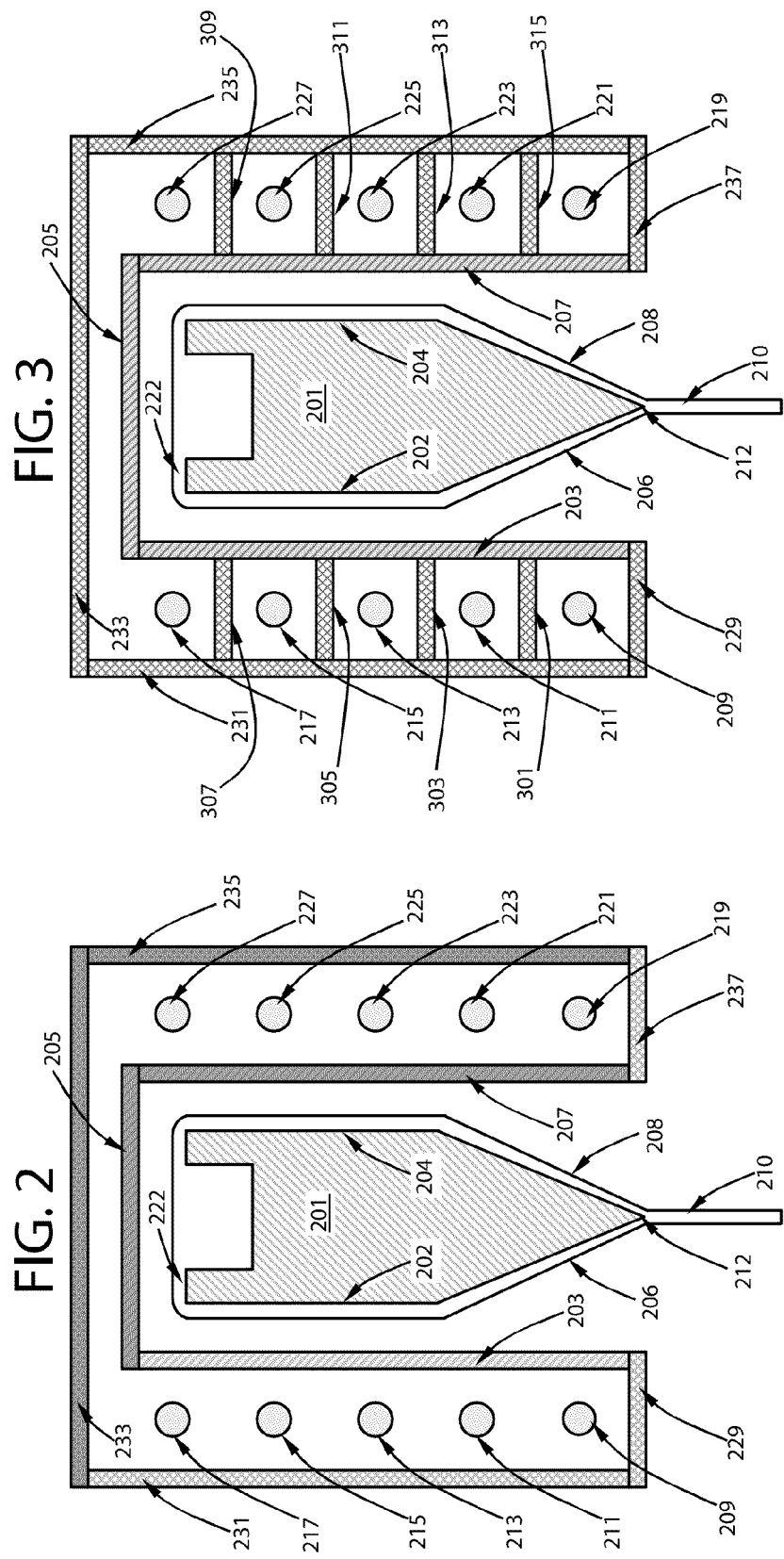

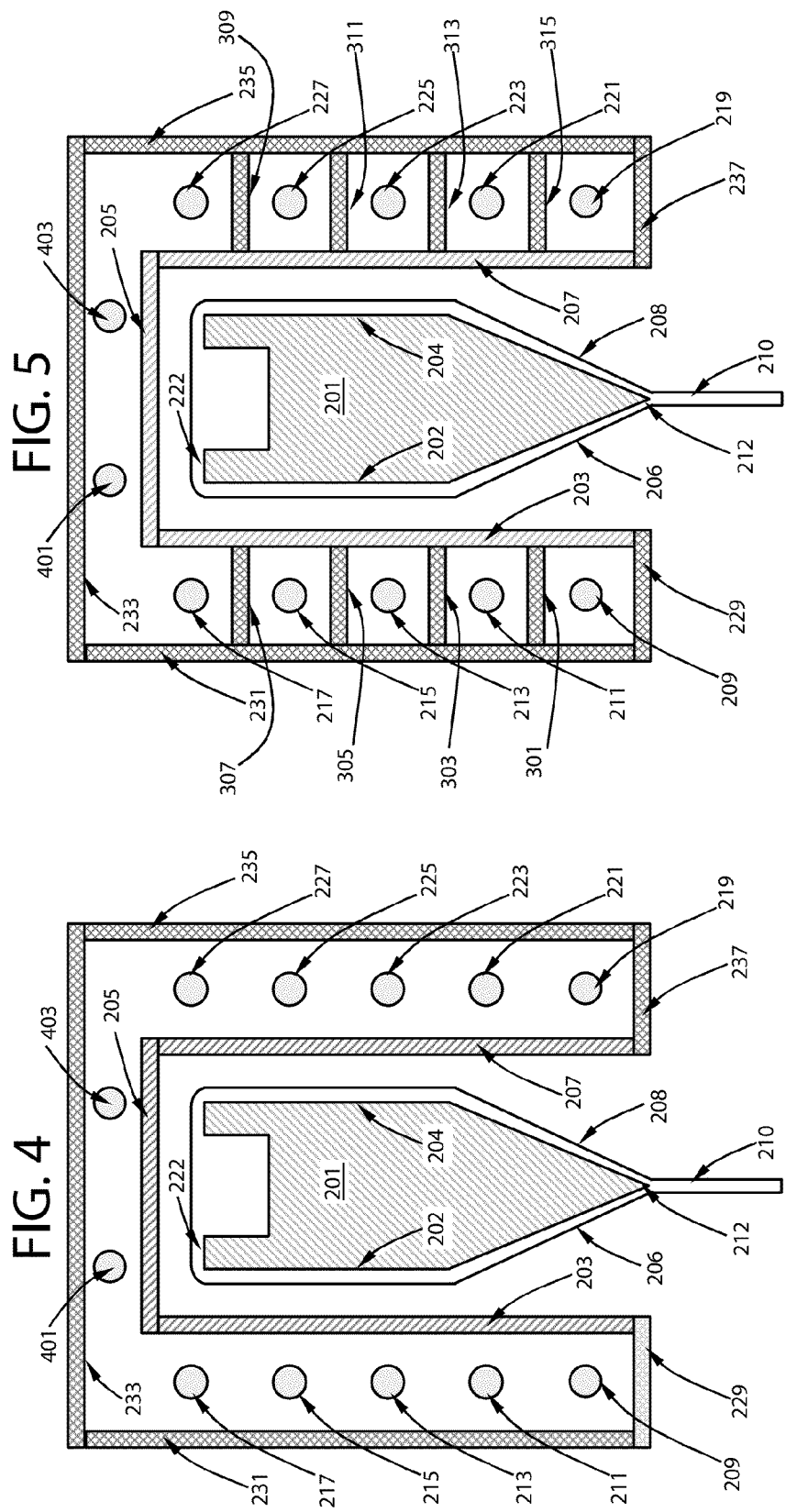

METHOD AND APPARATUS FOR MAKING A GLASS SHEET WITH CONTROLLED HEATING

This application claims the benefit of priority to U.S. Provisional Application No. 61/265,003 filed on Nov. 30, 2009.

TECHNICAL FIELD

The present invention relates to apparatus and method for making glass sheets. In particular, the present invention relates to fusion down-draw apparatus and method for making glass sheets. The present invention is useful, e.g., in making glass sheets for LCD substrates.

BACKGROUND

A leading process for making high-quality glass substrates with pristine surface quality for LCD displays is the fusion down-draw process. The forming device ("forming body" hereafter) in a fusion down-draw process, typically called an isopipe, is illustrated in FIG. 1(PRIOR ART). The forming body 100 illustrated in this figure comprises a trough-shaped part 103 and a wedge-shaped part 107. A glass melt is introduced into the trough-shaped part through an inlet tube 101. A stream of glass melt is allowed to flow over each side of the trough-shaped part, down on both sides of the trough-shaped part and wedge-shaped part, forming a glass ribbon on each side surface of the forming body. The two glass ribbons join at the bottom of the wedge-shaped part 109, typically called root of the forming body, where they fuse together to form a single glass ribbon 111 having two pristine surfaces that have not been exposed to the forming body surface. The glass ribbon 111 is then typically drawn below the root 109 into the desired thickness and allowed to cool to form a rigid glass sheet. As shown, the glass ribbon 111 is drawn in a downward direction 113. The temperature of the glass ribbons from the top of the forming body to immediately below the root are very carefully controlled in order to repeatedly make glass sheet products with desired thickness, thickness homogeneity, and other desired physical properties.

The forming body typically comprises one or more refractory blocks made of materials such as zircon ceramic. The dimensional and geometrical stability and side surface quality of the forming body has significant impact on the quality of the glass sheet product produced.

Thermal gradient in the forming body material can cause stress inside the bulk and/or near the surface of the forming body. Overly high stress can lead to surface cracking, dimensional and geometrical distortion, and even breakdown, of the forming body. Therefore, the thermal gradient the forming body experiences during its life has to be carefully controlled.

Therefore, there exists a need for a method and apparatus that effectively controls the thermal environment of a forming body during a fusion draw process.

The present invention satisfies this and other needs.

SUMMARY

Several aspects of the present invention are disclosed herein. It is to be understood that these aspects may or may not overlap with one another. Thus, part of one aspect may fall within the scope of another aspect, and vice versa. Unless indicated to the contrary in the context, the differing aspects shall be considered as overlapping with each other in scope.

Each aspect is illustrated by a number of embodiments, which, in turn, can include one or more specific embodiments. It is to be understood that the embodiments may or may not overlap with each other. Thus, part of one embodiment, or specific embodiments thereof, may or may not fall within the ambit of another embodiment, or specific embodiments thereof, and vice versa. Unless indicated to the contrary in the context, the differing embodiments shall be considered as overlapping with each other in scope.

According to a first aspect of the present disclosure, provided is a method for making a glass sheet by an overflow process using a forming body having a top, a first side surface, and a second side surface joining the first side surface at a root, the method comprising flowing molten glass over at least part of the first side surface to form a first glass ribbon, flowing molten glass over at least part of the second side surface to form a second glass ribbon, and fusing the first glass ribbon and the second glass ribbon at the root to form a third glass ribbon, wherein:

(A) the first side surface is radiatively heated by a first side heat plate which is heated by a first array of separately monitored and controlled heating elements located behind he first side heat plate;

(B) the second side surface is radiatively heated by a second side heat plate which is heated by a second array of separately monitored and controlled heating elements located behind the second side heat plate; and (C) the heating power of the heating elements of the first and second arrays are controlled such that if the heating power of a malfunctioning heating elements in the first and second arrays decreases to a threshold level, the heating power of an adjacent, functioning heating element is increased, such that an undesirable thermal gradient does not form between a part of the side surface and the bulk under the part of the side surface.

In certain embodiments of the first aspect of the present invention, if the heating power of a malfunctioning heating element in the first and second arrays decreases to a threshold level, the heating powers of all adjacent, functioning heating elements are increased.

In certain embodiments of the first aspect of the present invention, at any given time, the temperature gradient in the top layer of the first and second side surfaces having a thickness of 5 cm is maintained at a level of at most 100° C., in certain embodiments at most 80° C., in certain embodiments at most 60° C., in certain embodiments at most 50° C., in certain embodiments at most 40° C., in certain embodiments at most 30° C., in certain embodiments at most 20° C., in certain embodiments at most 10° C.

In certain embodiments of the first aspect of the present invention, the forming body is inside an enclosure defined by the first side heat plate, the second heat plate, and a top plate over the top of the forming body connecting the first and second side heat plates.

In certain embodiments of the first aspect of the present invention, the first and second side heat plates are made of a material selected from platinum, platinum-containing alloys, SiC, $Si_3N_4$, $SiO_2$, MgO, and BeO.

In certain embodiments of the first aspect of the present invention, the forming body is symmetrical with respect to a plane parallel to the gravity vector and passing through the root.

In certain embodiments of the first aspect of the present invention, the first and second side heating plates are symmetrical with respect to a plane parallel to the gravity vector and passing through the root.

In certain embodiments of the first aspect of the present invention, the first and second arrays of heating elements are symmetrical with respect to a plane parallel to the gravity vector and passing through the root.

In certain embodiments of the first aspect of the present invention, the top plate is made of a material selected from platinum, platinum-containing alloys, SiC, $Si_3N_4$, $SiO_2$, MgO, and BeO.

In certain embodiments of the first aspect of the present invention, the top plate and the first and second side plates are made of the same material.

In certain embodiments of the first aspect of the present invention, the top plate is further heated by a third array of heating elements located above the top plate.

In certain embodiments of the first aspect of the present invention, the third array of heating elements are symmetrical with respect to a plane parallel to the gravity vector passing through the root.

In certain embodiments of the first aspect of the present invention, the first and second side heat plates are made of SiC or $Si_3N_4$ and have a thickness of at most 50 mm, in certain embodiments at most 40 mm, in certain embodiments at most 30 mm, in certain embodiments at most 20 mm, in certain embodiments at most 10 mm, in certain embodiments at most 5 mm.

In certain embodiments of the first aspect of the present invention, the heating elements in the first and second arrays are linear.

In certain embodiments of the first aspect of the present invention, the heating elements in the third array are linear.

In certain embodiments of the first aspect of the present invention, the heating elements are essentially parallel to the root.

In certain embodiments of the first aspect of the present invention, the temperature difference between the top and root of the forming body is maintained from DTTB−25° C. to DTTB+25° C., where DTTB is the average of the temperature difference between the top and root of the forming body, in certain embodiments from DTTB−20° C. to DTTB+20° C., in certain embodiments from DTTB−15° C. to DTTB+15° C., in certain embodiments from DTTB−10° C. to DTTB+10° C., in certain embodiments from DTTB−5° C. to DTTB+5° C., in certain embodiments from DTTB−2° C. to DTTB+2° C.

In certain embodiments of the first aspect of the present invention, cracking of the forming body is avoided due to a thermal gradient.

In certain embodiments of the first aspect of the present invention, a heating element in the first and second arrays of heating elements is separated from an adjacent heating element by a separation plate. In certain more specific embodiments, all heating elements are separated from their adjacent heating elements by a separation plate.

According to a second aspect of the present invention, an apparatus for making a glass sheet in a fusion draw process comprises:

(i) a forming body having a top, a first side surface, a second side surface joining the first side surface at a root;

(ii) a first side heat plate proximate to the first side surface adapted for radiatively heating the first side surface;

(iii) a first array of heating elements located behind the first heat plate;

(iv) a second side heat plate proximate to the first side surface adapted for radiatively heating the first side surface;

(v) a second array of heating elements located behind the second heat plate; and (vi) a power supply unit adapted for monitoring, controlling and adjusting the heating power of the heating elements in the first and second arrays of the heating elements, comprising a control module that increases a heating power of a functioning heating element if the heating power of an adjacent malfunctioning heating element decreases to a threshold level.

In certain embodiments of the second aspect of the present invention, the power supply unit comprises a control module that increases the heating powers of all functioning heating elements if the heating power of an adjacent malfunctioning heating element decreases to a threshold level.

In certain embodiments of the second aspect of the present invention, the apparatus comprises a top plate over the top of the forming body connecting the first and second side heat plates, and the first and second side heat plates and the top plate define an enclosure housing the forming body.

In certain embodiments of the second aspect of the present invention, the first and second side heat plates are made of a material selected from platinum, platinum-containing alloys, SiC, $Si_3N_4$, $SiO_2$, MgO, and BeO.

In certain embodiments of the second aspect of the present invention, the forming body is symmetrical with respect to a plane parallel to the gravity vector and passing through the root.

In certain embodiments of the second aspect of the present invention, the first and second side heating plates are symmetrical with respect to a plane parallel to the gravity vector and passing through the root.

In certain embodiments of the second aspect of the present invention, the first and second arrays of heating elements are symmetrical with respect to a plane parallel to the gravity vector and passing through the root.

In certain embodiments of the second aspect of the present invention, the top plate is made of a material selected from platinum, platinum-containing alloys, SiC, $Si_3N_4$, $SiO_2$, MgO, and BeO.

In certain embodiments of the second aspect of the present invention, the top plate and the first and second side plates are made of the same material.

In certain embodiments of the second aspect of the present invention, the apparatus further comprises, above and proximate to the top plate, a third array of heating elements.

In certain embodiments of the second aspect of the present invention, the third array of heating elements are symmetrical with respect to a plane parallel to the gravity vector passing through the root.

In certain embodiments of the second aspect of the present invention, the first and second side heat plates are made of SiC or $Si_3N_4$ and have a thickness of at most 50 mm, in certain embodiments at most 40 mm, in certain embodiments at most 30 mm, in certain embodiments at most 20 mm, in certain embodiments at most 10 mm, in certain embodiments at most 5 mm.

In certain embodiments of the second aspect of the present invention, the heating elements in the first and second arrays are linear.

In certain embodiments of the second aspect of the present invention, the heating elements in the third array are linear.

In certain embodiments of the second aspect of the present invention, the heating elements are essentially parallel to the root.

In certain embodiments of the second aspect of the present invention, a heating element in the first and second arrays of heating elements is separated from an adjacent heating element by a separation plate. In certain more specific embodiments, all heating elements are separated from their adjacent heating elements by a separation plate.

One or more embodiments of the present invention have one or more of the following advantages. By increasing the heating power of an adjacent heating element immediately after the failure of a heating element, the present invention significantly reduces the probability of high temperature gradient in the surface area of the forming body that the failed heating element regulates, thereby reducing the probability of surface cracking of the forming body in that area, significantly improving the process stability and system life.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

BRIEF DESCRIPTION OF THE DRAWINGS

In the accompanying drawings:

FIGS. 2-5 schematically illustrate a forming body operating to make a glass ribbon housed inside an enclosure according to various embodiments of the present invention.

DETAILED DESCRIPTION

Figure 1:
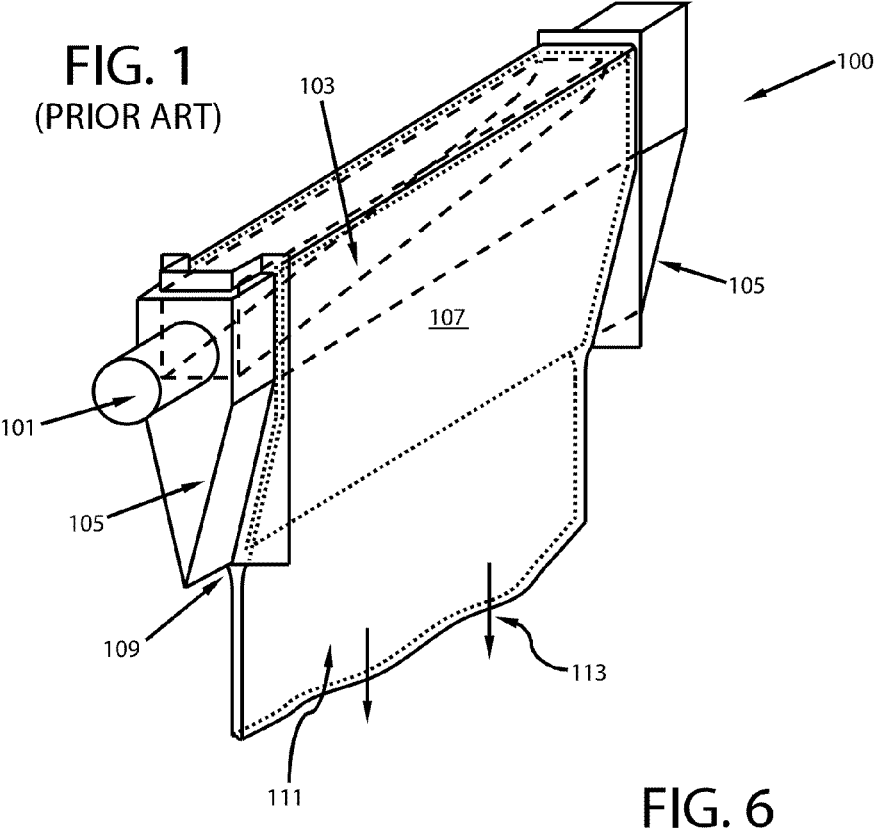
FIG. 1 (PRIOR ART) schematically illustrates a forming body operating to make a glass ribbon by the fusion downdraw process.

Unless otherwise indicated, all numbers such as those expressing weight percents of ingredients, dimensions, and values for certain physical properties used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique. As used herein, in describing and claiming the present invention, the use of the indefinite article "a" or "an" means "at least one," and should not be limited to "only one" unless explicitly indicated to the contrary.

Fusion forming process starts by heating up the forming body from the room temperature to its operating temperature. Due to the nature of complexity in temperature profile on the forming body and corresponding thermal stress which is a potential source of forming body failure, it is desirable to keep the temperature difference between the bottom and top of the forming body as low as possible. It is also desirable to heat up the forming body slow enough to make the rate of stress increase lower than the rate of stress relaxation from the high temperature creep of forming body material. Thus, spatial and temporal controls of temperature on the forming body are important to prevent forming body failure.

Previously, it has been believed that the predominant source of thermal stress on the forming body is the temperature difference between the bottom and the top of the forming body. Therefore, in case of a failure of a heating element, according to this theory, the heating powers of all heating elements on both sides of the forming body should be desirably decreased.

However, it has been found that the main driver as a stress riser during rapid temperature change is the temperature difference between the surface and core of the forming body. Thus, it is necessary for minimizing this temperature difference to mitigate the high tensile stress on the surface of the forming body.

This invention is related to a process of thermal compensation for reducing thermal stress on the forming body during the temperature upset caused by malfunctioning heating elements. The idea is to apply thermal compensation locally to the site of failure for heating up the surface of the site, instead of decreasing the heating powers of all remaining heating elements. Since the main driver of stress increase during these types of events is not the top to bottom thermal gradient but the skin to core gradient, method of compensation according to the previous theory is less effective and can sometimes result in providing negative impact on the forming body by making the situation worse. This invention of thermal compensation focuses the local site where there is a heat loss and adds heat to the area to prevent high tensile stress on the surface of the forming body which is vulnerable to failure. This invention helps to reduce the stress on the forming body quickly and effectively to minimize the risk of failure of the forming body during the process of initial heating up and/or normal operation of the forming body.

FIG. 2 is a schematic illustration of muffle cross section which includes a forming body 201 housed inside an enclosure defined by a first side heating plate 203, a top plate 205 and a second side heating plate 207, a first array of heating elements behind the first side heating plate 203 comprising heating elements 209, 211, 213, 215 and 217, a second array of heating elements behind the second side heating plate 207 comprising heating elements 219, 221, 223, 225 and 227, which are further housed in an enclosure. The forming body 201 comprises a top 222, a first side surface 202, and a second side surface 204 joining the first side surface 202 at root of the isopipe 212 of the forming body. A glass melt is introduced into the trough-shaped part of the forming body, allowed to overflow the top 222 thereof, flow down the side surfaces 202 and 204 to form a first glass ribbon 206 and 208 respectively which join at the root 212 of the forming body to form a single, third ribbon 210. The third ribbon 210 is further drawn below the root 212 to form a thin glass sheet.

Each of heating elements has a potential to fail in use that could induce the failure of the forming body. For example, in a hypothetical case where both 209 and 219 fail, three different approaches have been analyzed to prove a superiority of this invention.

In a first approach according to the previous stress theory described supra, the failure of 209 and 219 causes rapid temperature drop at the bottom portion of the forming body, the heating powers of 211, 213, 215, 217, 22, 223, 225 and 227 are reduced to mitigate the temperature difference between bottom and top portion of the forming body. However, as described above, the main driver of stress rise during this rapid temperature change is thermal gradient between the cold surface resulting from loss of heating powers from the heating elements, especially from 209 and 219, and the bulk of the forming body below the surface that remains hot. Thus, this first approach, while maintaining a minimal temperature difference fluctuation between the top and the root of the forming body, increases the thermal stress between the side surfaces and the bulk of the forming body, and therefore exacerbates the probability of crack-formation and failure of the forming body.

A second approach is not to take a compensation action in case of the failure of 209 and 219, and the heating powers of all the remaining, functional heating elements are maintained substantially unchanged. As can be understood in light of the teaching herein, the thermal stress of the bottom part of the wedge-shaped part of the forming body can be quite high due to the sudden loss of heating powers from 209 and 219.

A third approach, which is according to one embodiment of this invention, proposes that heating elements 211 and 221, which are adjacent to the malfunctioning heating elements 209 and 219, respectively, should have power increase to compensate the local heat loss caused by malfunctioning 209 and 219. The heating powers of the remaining heating elements, 213, 215, 217, 223, 225 and 227 can be decreased slightly, remain unchanged or increased slightly, depending on the case. This approach would minimize the surface-to-core thermal stress in the forming body, especially in the bottom part of the wedge-shaped part, hence reduce the probability of crack formation and catastrophic failure of the forming body.

Figure 6:
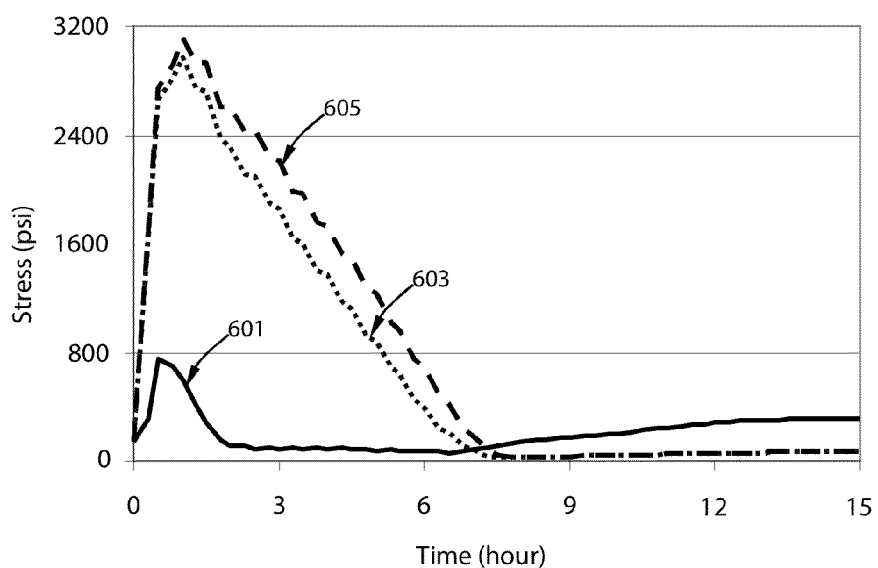
FIG. 6 is a diagram comparing the maximum stresses a forming body can experience in embodiments according to the present invention and not according to the present invention.

FIG. 6 compares the maximal stress levels of in the surface region of a forming body treated according to the three approaches above. In this figure, 601 stands for the third approach according to an embodiment of the present invention, 603 stands for the second approach where no compensation action is taken, and 605 stands for the first approach where all heating elements are reduced in heat powers in response to the failure of 209 and 219. From this graph, it is clear that the present invention significantly reduces the stresses the forming body experiences compared to comparative approaches.

The heating elements 209, 211, 213, 215, 217, 219, 221, 223, 225 and 227 can be resistive heating elements made of materials such as platinum windings, SiC glow-bars, and the like. Desirably the heating powers of these heating elements are adjustable within a relatively large range, e.g., from 0.5 KW to 500 KW each, in certain embodiments from 1 KW to 400 KW, in certain other embodiments from 1 KW to 300 KW, in certain embodiments from 1 KW to 100 KW, in certain embodiments from 1 KW to 80 KW, in certain embodiments from 1KW to 50 KW, in certain embodiments from 1 KW to 40 KW, in certain embodiments from 1 KW to 30 KW. As shown in FIGS. 2-5, in these particular embodiments of the present invention, the heating elements are placed on two sides of the forming body and form two arrays. Since it is highly desirable that the thermal environments the two sides of the forming body are exposed to are identical, it is highly desirable that the two arrays of heating elements are arranged essentially symmetrically with respect to a central plane passing through the root of the forming body. FIGS. 2-5 show five heating elements on each side of the forming body. In practice, each of the first and second arrays of heating elements can contain more or fewer heating elements.

The heating powers of the heating elements 209, 211, 213, 215, 217, 219, 221, 223, 225 and 227 are desirably individually monitored, controlled and adjustable. Thus, in certain embodiments, a power supply unit can monitor the current passing through each of the heating elements, determine whether a heating element is functional or malfunctioning, whether the heating power of a heating element is below a threshold level, and individually control and adjust the current and/or heating power of all the heating elements.

Advantageously, in certain embodiments, the heating elements are essentially linear and parallel to the root of the forming body. Such horizontal arrangement of linear heating elements is desirable to precisely control and maintain a desirable temperature gradient from the top to the bottom of the side heating plates. In certain embodiments, each of 209, 211, 213, 215, 217, 219, 221, 223, 225 and 227 contains a single, continuous resistive heating element. In other embodiments, each of 209, 211, 213, 215, 217, 219, 221, 223, 225 and 227 may contain one or more resistive components connected serially and/or in parallel.

The heating elements are held in close proximity to the side heating plates as shown in the embodiments of FIGS. 2-5. Thus, each heating element is primarily responsible for heating a certain area of the adjacent side heating plate. For example, heating elements 209 and 219 primarily regulate the bottom area of the first side heating plate 203 and the second side heating plate 207, respectively, 213 and 223 are primarily responsible for heating the central area of the side heating plates, and 217 and 227 primarily for heating the top area of the side heating plates. Such segmented heating arrangement makes it possible to establish a desirable thermal gradient from the top to the bottom of the side heating plates.

The heating elements are desirably housed inside an enclosure defined by insulation walls 231, 233 and 235. The heating elements are advantageously designed to be easily replaceable in the assembly without having to shut down the whole apparatus during production in case of heating element failure. Once a malfunctioning heating element is replaced by a functional one, it is desired that the heating regime of all the heating elements resume the normal operation mode.

In the embodiments illustrated schematically in FIGS. 2 and 4, between each adjacent heating element, no insulation material is present. Thus, the areas in the side heating plates directly regulated by two adjacent heating elements (i.e., areas within the fields of view of the heating elements) overlap. Such overlap may or may not be desirable in certain embodiments. In general, segregation of adjacent heating elements leads to better controllability of the thermal gradient in the side heating plate, all other conditions held equal. Therefore, in certain embodiments, such as those illustrated in FIGS. 3 and 5, between two adjacent heating elements in the first and second arrays, separation walls 301, 303, 305, 307, 309, 311, 313 and 315 are installed.

In certain embodiments, to maintain a desirable temperature of the top of the forming body, it is desirable to install heating elements above the top plate of the enclosure housing the forming body. FIGS. 4 and 5 illustrate embodiments comprising a third array of heating elements 401 and 403. Since a uniform temperature across the top of the forming body is highly desired, a uniform temperature of the top plate 205 is highly desired. Therefore, it is advantageous not to install separation walls between the top heating elements 401 and 403, as illustrated in FIGS. 4 and 5.

It is highly desirable that the top and the side surfaces of the forming body are not directly in the fields of view of the heating elements. This is because the discontinuous spatial heating power distribution from the top heating element to the bottom heating element would result in undesirable heating power profile delivered to the top and side surfaces of the forming body, if the heating elements are allowed to directly radiatively heat the forming body.

Thus, the side heating plates 203 and 207 are installed to block the forming body from direct view of the heating elements. In essence, the side heating plates function as heat sinks that provide the desired heating power profile. Desirably, the side heating plates are made of refractory materials such as SiC, $Si_3N_4$, SiO2, MgO and BeO, Pt and alloys thereof, and more desirably a material having a high thermal conductivity such as SiC, $Si_3N_4$, platinum and alloys thereof, and the like. The higher the thermal conductivity of the plate, the thinner the plate is required to achieve a desired thermal gradient. The high thermal conductivity allows the formation of a continuous spatial thermal gradient from the top to the bottom of the plate that the side surfaces of the forming body is exposed to. A SiC or $Si_3N_4$ plate having a thickness at most 50 mm, in certain embodiments at most 40 mm, in certain embodiments at most 30 mm, in certain embodiments at most 20 mm, in certain embodiments at most 10 mm, in certain embodiments at most 5 mm, may be advantageously used for the side heating plates.

Since it is highly desirable that the two side surfaces 202 and 204 of the forming body are exposed to an identical thermal environment, it is highly desirable that the two side heating plates 203 and 207 are symmetrical with respect to a central plane, such as a plane passing through the root 212 of the forming body. Thus, the two side heating plates 203 and 207 are advantageously made of the same material, have the same dimension, geometry and dimensional and geometrical stability.

In certain embodiments, it is desired that the top plate 205, regardless of whether it is heated by a third array of heating elements, is made of the same material as the side heating plates 203 and 207.

By using the method and apparatus of the present invention, in certain embodiments, at any given time, the temperature gradient in the top layer of the first and second side surfaces having a thickness of 5 cm of the forming body can be maintained at a level of at most 100° C., in certain embodiments at most 80° C., in certain embodiments at most 60° C., in certain embodiments at most 50° C., in certain embodiments at most 40° C., in certain embodiments at most 30° C., in certain embodiments at most 20° C., in certain embodiments at most 10° C. "The temperature gradient in the top layer of the first and second side surfaces having a thickness of 5 cm" means the largest temperature difference in a hypothetical cylindrical sample having a height of at most 5 cm and a diameter of 1 cm starting from an area of the side surface extending in a direction perpendicular to the side surface of forming body. Such temperature gradient in case of a failure of a heating element can be manifested by a lowest surface temperature (i.e., temperature of a top circular surface of the hypothetical cylindrical sample located on a side surface of the forming body), and a highest core temperature (i.e., temperature of the bottom circular surface of the cylindrical sample located in the bulk of the forming body).

By using the first and second side heating plates and the first and second arrays of heating elements, the temperature difference between the top and the root of the forming body can be maintained from DTTB−25° C. to DTTB+25° C., where DTTB is the average of the temperature difference between the top and root of the forming body, in certain embodiments from DTTB−20° C. to DTTB+20° C., in certain embodiments from DTTB−15° C. to DTTB+15° C., in certain embodiments from DTTB−10° C. to DTTB+10° C., in certain embodiments from DTTB−5° C. to DTTB+5° C., in certain embodiments from DTTB−2° C. to DTTB+2° C. Thus, the fluctuation of the temperature difference between eth top and the root of the forming body is minimized.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. A method for making a glass sheet by an overflow process using a forming body having a top, a first side surface, and a second side surface joining the first side surface at a root, the method comprising flowing molten glass over at least part of the first side surface to form a first glass ribbon, flowing molten glass over at least part of the second side surface to form a second glass ribbon, and fusing the first glass ribbon and the second glass ribbon at the root to form a third glass ribbon, wherein:
   (A) the first side surface is radiatively heated by a first side heat plate which is heated by a first array of separately monitored and controlled heating elements located behind the first side heat plate;
   (B) the second side surface is radiatively heated by a second side heat plate which is heated by a second array of separately monitored and controlled heating elements located behind the second side heat plate; and
   (C) the heating power of the heating elements of the first and second arrays are controlled such that if the heating power of a malfunctioning heating element or elements in the first and second arrays decreases to a threshold level, the heating power of the adjacent, functioning heating element is increased, such that an undesirable thermal gradient does not form between a part of the side surface across from the malfunctioning heating element or elements and a bulk of the forming body under the part of the side surface across from the malfunctioning heating element or elements.

2. A method according to claim 1, wherein at any given time, the temperature gradient in the top layer of the first and second side surfaces having a thickness of 5 cm is maintained at a level of at most 100° C.

3. A method according to claim 1, wherein the forming body is inside an enclosure defined by the first side heat plate, the second heat plate, and a top plate over the top of the forming body connecting the first and second side heat plates.

4. A method according to claim 1, wherein the first and second side heat plates are made of a material selected from platinum, platinum-containing alloys, SiC, $Si_3N_4$, $SiO_2$, MgO, and BeO.

5. A method according to claim 1, wherein the forming body is symmetrical with respect to a plane parallel to the gravity vector and passing through the root.

6. A method according to claim 1, wherein the first and second side heating plates are symmetrical with respect to a plane parallel to the gravity vector and passing through the root.

7. A method according to claim 1, wherein the first and second arrays of heating elements are symmetrical with respect to a plane parallel to the gravity vector and passing through the root.

8. A method according to claim 1, wherein the top plate is made of a material selected from platinum, platinum-containing alloys, SiC, $Si_3N_4$, $SiO_2$, MgO, and BeO.

9. A method according to claim 1, wherein the top plate and the first and second side plates are made of the same material.

10. A method according to claim 1, wherein the first and second side heat plates are made of SiC or $Si_3N_4$ and have a thickness of at most 50 mm.

11. A method according to claim 1, wherein the first and second array of heating elements are essentially linear and parallel to the root.

12. A method according to claim 1, wherein the temperature difference between the top and root of the forming body is maintained from DTTB−25° C. to DTTB+25° C., where DTTB is the average of the temperature difference between the top and root of the forming body.

13. A method according to claim 1, wherein cracking of the forming body is avoided due to a thermal gradient.

14. A method according to claim 1, wherein a heating element in the first and second arrays of heating elements is separated from an adjacent heating element by a separation plate.

15. The method according to claim 1, wherein the top is radiatively heated by a third side heat plate which is heated by a third array of separately monitored and controlled heating elements located behind the third side heat plate.

16. The method according to claim 15, wherein there is no separation wall between the heating elements in the third array of separately monitored and controlled heating elements.

* * * * *